United States Patent [19]

Akabane et al.

[11] 4,259,099
[45] Mar. 31, 1981

[54] GAS FILTER DEVICE

[75] Inventors: Tadashi Akabane; Tooru Tamura, both of Toyota, Japan

[73] Assignee: Aisin Seiki Kabushiki Kaisha, Kariya, Japan

[21] Appl. No.: 143,259

[22] Filed: Apr. 24, 1980

Related U.S. Application Data

[63] Continuation of Ser. No. 965,130, Nov. 30, 1978, abandoned.

[30] Foreign Application Priority Data

Dec. 13, 1977 [JP] Japan .......................... 52-167423[U]

[51] Int. Cl.³ .............................................. B01D 50/00
[52] U.S. Cl. ..................................... 55/482; 55/494; 55/501; 123/568; 210/316
[58] Field of Search ................. 55/482, 485, 494, 495, 55/501, 503, 527, 528; 210/314, 316; 123/568

[56] References Cited

U.S. PATENT DOCUMENTS

| | | | |
|---|---|---|---|
| 1,739,093 | 12/1929 | Ruby | 55/482 |
| 1,807,521 | 5/1931 | Foulk | 55/482 |
| 2,689,199 | 9/1954 | Pesce | 55/528 |
| 2,796,950 | 6/1957 | Hersey, Jr. | 55/527 |
| 2,826,265 | 3/1958 | DeWoody | 55/527 |
| 2,888,095 | 5/1959 | Perrini et al. | 55/528 |
| 3,387,435 | 6/1968 | Broad, Jr. | 55/482 |
| 3,747,772 | 7/1973 | Brown | 55/501 |
| 3,953,182 | 4/1976 | Roth | 55/485 |

FOREIGN PATENT DOCUMENTS

| | | | |
|---|---|---|---|
| 848961 | 9/1939 | France | 55/482 |
| 303838 | 2/1955 | Switzerland | 55/482 |

*Primary Examiner*—David L. Lacey
*Attorney, Agent, or Firm*—Sughrue, Rothwell, Mion, Zinn and Macpeak

[57] ABSTRACT

A gas filter device, adapted to be installed between an exhaust emission control device and an intake manifold of an internal combustion engine for filtration of the intake manifold gases which pass to the control device upon variations in vacuum, is comprised of a filtering chamber having an inlet port for connection to the intake manifold and an outlet port for connection to the control device, a first filter element positioned in the chamber and including glass fiber, metallic wire, and sintered bronze, a second filter element positioned in the chamber between the outlet port and the first filter element and made of non-woven cloth having a fine texture, a retaining late located between the inlet port and the first filter element and having multiple passageways, and a hat-shaped separating disc having multiple passageways and a head portion installed between the first filter element and the second filter element for keeping the second filter element away from the first filter element.

3 Claims, 4 Drawing Figures

GAS FILTER DEVICE

This is a continuation of application Ser. No. 965,130, filed Nov. 30, 1978, now abandoned.

BACKGROUND OF THE INVENTION

1. Field of the Invention

The present invention relates to a gas filter device and more particularly to an improved gas filter device adapted to be installed between an exhaust emission control device and an intake manifold.

2. Prior Art

U.S. Pat. Nos. 3,360,131 and 3,782,083 each disclose a filter device having a single filter element to be used in the passageway of a gas utilization system for filtering the gas. It is difficult to sufficiently filter the gas by such filter devices. Therefore, a prior art gas filter device having two filter elements has been proposed as shown in FIG. 4 of the accompanying drawings of this application. In this type of gas filter device 140, a first filter element 165 is located on a retaining plate 160 having multiple passageways 161, which is mounted on a flange 145 of a body member 141. A second filter element 168 engages the first filter element 165 opposite plate 160. The intake atmospheric gases including petrol mist, dust, soot, and other foreign materials pass from an inlet port 143 of a screw nipple 142 to an outlet port 152 of extension nipple 151 through the passageways 161 and the two filter elements 165 and 168. Consequently, such foreign materials are channeled or forced through the two filter elements and will flow to the outlet port 152 as shown by the arrows in FIG. 4. As a result, the outlet port 152 is likely to clog with the foreign materials so that the durability of the filter element in the conventional gas filter device as shown in FIG. 4 is poor.

SUMMARY OF THE INVENTION

It is a principal object of the present invention to provide a gas filter device wherein the difficulties of the conventional device may be resolved. It is another object of the present invention to provide a gas filter device which is simple in construction, low in cost, and reliable in filtration.

It is a further object of the present invention to provide a gas filter device comprising a filtering chamber having an inlet port adapted to be connected to an intake manifold and an outlet port adapted to be connected to a control device, a first filter element mounted in said chamber, a second filter element mounted in said chamber between said outlet port and said first filter element, retaining means located between said inlet port and said first filter element, said retaining means having multiple passageways, and separating means mounted between said first filter element and said second filter element for keeping said second filter element away from said first filter element, said separating means having multiple minute passageways.

The foregoing and other objects, features and advantages of the invention will be apparent from the following more particular description of a preferred embodiment of the invention as illustrated in the accompanying drawings.

DETAILED DESCRIPTION OF THE PREFERRED EMBODIMENT

Figure 1:
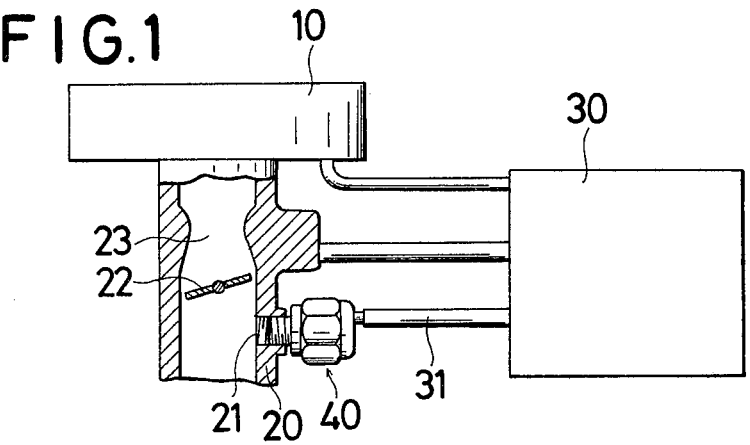
FIG. 1 is a schematic view of an exhaust emission cleaning system incorporating a gas filter device according to the present invention.

Referring to the drawings, there is illustrated in FIG. 1 an exhaust emission cleaning system as may be used with an internal combustion engine. The purpose of the system as shown in FIG. 1 is to control the throttle position of a carburetor in the engine, the spark timing point of the fuel combustion in the cylinders of the engine, an exhaust gas recirculation from the exhaust manifold to the intake manifold in the engine, an air injection into the exhaust manifold of the engine, and for the choke valve opening of the carburetor in the engine in response to the vacuum signals to clean and control the exhaust emissions in the exhaust manifold of the engine. An air cleaner 10 is installed over the top of the carburetor communicating with an intake manifold 20. A throttle valve 22 is located after a venturi portion 23 of the carburetor. The exhaust emission control device 30 may be a throttle position controller, a spark timing point controller, an exhaust gas recirculation controller, an air injection controller and/or a choke valve opening controller. A gas filter device 40, in accordance with the present invention, is hermetically secured to the opening port 21 of the intake manifold 20 by means of a screw nipple 42. The outlet means of the gas filter device 40 is connected by a conduit means 31 to the control device 30 thereby to filter the intake manifold gases which pass to the control device 30 upon variations in the vacuum in the intake manifold.

Figure 2:
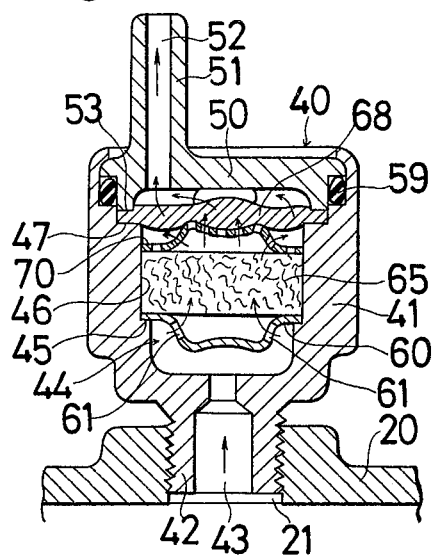
FIG. 2 is a vertical cross-sectional view through a gas filter device embodying the concept of the present invention.
Figure 3:
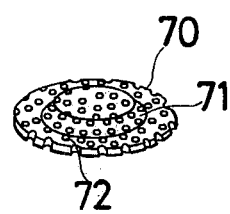
FIG. 3 is a perspective view of a separating seat as shown in FIG. 2.
Figure 4:
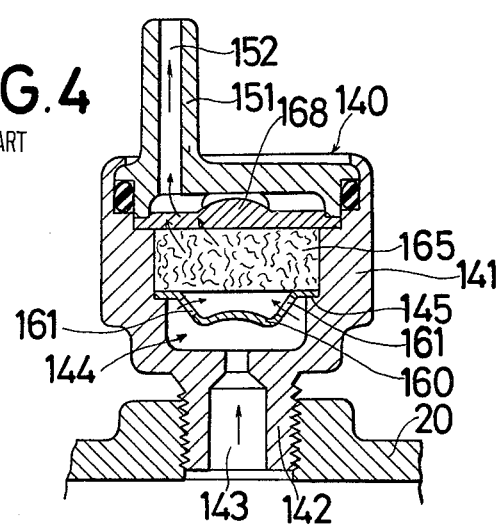
FIG. 4 is a vertical cross-sectional view through the conventional prior art gas filter device.

FIG. 2 shows the internal construction of a gas filter device 40 in accordance with the present invention comprising a retaining plate 60 having multiple passageways 61, a first filter element 65, a second filter element 68, and a separating seat 70 installed between the two elements. The housing for the gas filter device 40 is made up of a body member 41 and a cover member 50. A ring shaped packing 59 is interposed between the body member 41 and the cover 50 so that a hermetically sealed chamber 44 if formed. A screw nipple 42 at the lower end of the body member 41 is hermetically threaded into the opening port 21 in the intake manifold 20. Accordingly, the chamber 44 is connected to the vacuum of the intake manifold 20 through an inlet port 43. An extension nipple 51 at the upper portion of the disc-shaped cover member 50 is connected to the control device 30 by conduit means 31 as shown in FIG. 1. A second filter element 68 made of non-woven cloth, e.g. felt, with a fine texture is interposed between a shoulder 47 of the body member 41 and a shoulder 53 of the cover member 50 thereby partitioning off the chamber 44. The retaining plate 60 is mounted on another shoulder 45 of the body member 41. Located on the retaining plate 60 is the first filter element 65 fixed to a cylinder wall 46 of the body member 41. The first filter element 65 is generally made of material having innumerable minute pores including glass fiber, metallic wire, sintered bronze, or the like. Installed between the first filter element 65 and the second filter element 68 is the separating seat 70 which is the principal member of the present invention and which has multiple pin holes 72. The seat 70 includes a hat-shaped head 71 in contact with the second filter element 68 to keep the second filter element 68 away from the first filter element 65. Accordingly, the dirt passing through the first filter element 65 is widely spread when the dirt flows out of the multiple pin-holes 72 of the seat 70 so that the dirt is passed over the whole surface of the second filter element 68, as indicated by the arrows in FIG. 2. Consequently, the outlet port 52 is prevented from being clogged with the dirt.

Various modifications and alterations of this invention will become apparent to those skilled in the art without departing from the scope and spirit of this invention, and it should be understood that this invention is not to be unduly limited to the illustrative embodiment set forth herein.

What is claimed is:

1. A gas filter device for filtering intake manifold gases supplied to a control device upon variations of the vacuum in the intake manifold, said filter device comprising:

a body member having a filtering chamber therein, said body member having an inlet port adapted to connect said chamber to an intake manifold and an outlet port adapted to connect said chamber to a control device;

a first filter element mounted in said chamber;

a second filter element mounted in said chamber between said outlet port and said first filter element;

retaining means located between said inlet port and said first filter element, said retaining means having multiple passageways; and separating means mounted between said first filter element and said second filter element for keeping said second filter element away from said first filter element, said separating means comprising a hat-shaped disc provided with a plurality of minute passageways and having a raised central portion in contact with said second filter element and an annular peripheral portion in contact with said first filter element;

the outer periphery of said raised central portion of said hat-shaped disc being spaced inwardly from an inside wall of said chamber with only the outer periphery of said annular peripheral portion being in contact with an inside wall of said chamber.

2. A gas filter device according to claim 1, wherein said second filter element is a non-woven cloth of a fine texture.

3. A gas filter device as set forth in claim 1, wherein said first filter element is comprised of a porous mass.

* * * * *